(12) United States Patent
Link et al.

(10) Patent No.: US 7,035,761 B2
(45) Date of Patent: Apr. 25, 2006

(54) METHOD FOR ANALYZING WAVINESS OF A SURFACE

(75) Inventors: Gregory Link, Canton, MI (US); Raghunandan Sridhara, Canton, MI (US); Youssef Hamidieh, Bloomfield, MI (US); Mark Malburg, Columbus, IN (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/711,124

(22) Filed: Aug. 25, 2004

(65) Prior Publication Data

US 2005/0049823 A1    Mar. 3, 2005

Related U.S. Application Data

(60) Provisional application No. 60/498,080, filed on Aug. 26, 2003.

(51) Int. Cl.
  *G01B 13/16*  (2006.01)
  *G01B 11/06*  (2006.01)
  *F02F 3/00*  (2006.01)

(52) U.S. Cl. .................. 702/168; 123/193.1; 356/634

(58) Field of Classification Search ................ 702/157, 702/166, 167, 168; 73/1.89; 356/241.1, 356/634, 497, 572; 382/152, 141; 123/193.1; 250/559.22

See application file for complete search history.

(56) References Cited

U.S. PATENT DOCUMENTS

| 5,004,339 | A |   | 4/1991 | Pryor et al. ............... 356/241.1 |
| 5,208,766 | A |   | 5/1993 | Chang et al. ................ 382/141 |
| 5,488,476 | A |   | 1/1996 | Mansfield et al. .......... 356/512 |
| 6,392,749 | B1 | * | 5/2002 | Meeks et al. ............... 356/634 |
| 6,449,048 | B1 |   | 9/2002 | Olszak ....................... 356/497 |
| 6,610,992 | B1 |   | 8/2003 | Macaulay et al. ..... 250/559.22 |
| 6,684,844 | B1 |   | 2/2004 | Wang et al. ............. 123/193.1 |
| 6,882,956 | B1 | * | 4/2005 | Sermon et al. ............. 702/168 |
| 2002/0009221 | A1 |   | 1/2002 | Hercke et al. .............. 382/152 |

* cited by examiner

*Primary Examiner*—John Barlow
*Assistant Examiner*—John Le
(74) *Attorney, Agent, or Firm*—Raymond L. Coppiellie; Brooks & Kushman, P.C.

(57) ABSTRACT

A method for analyzing waviness of a surface. The method includes measuring a height of the surface, producing a set of data points indicative of a waviness profile, selecting a subset of the set of data points, calculating a waviness height of the subset, repeating the selecting, determining, and calculating steps for additional subsets until all members of the set of data points have been selected, and selecting a maximum waviness height value from the waviness heights calculated for each subset. The height of the surface may be measured over a distance longer than the length over which waviness assessment is required.

20 Claims, 3 Drawing Sheets

METHOD FOR ANALYZING WAVINESS OF A SURFACE

CROSS-REFERENCE TO RELATED APPLICATIONS

This application claims the benefit of U.S. provisional application Ser. No. 60/498,080 filed Aug. 26, 2003.

BACKGROUND OF THE INVENTION

1. Field of the Invention

The present invention relates to a method for determining the waviness of a surface, and more particularly to a method for predicting gaps between mating surfaces of an assembly due to waviness of the surface.

2. Background Art

Surface profiling instruments, such as profilometers, are used to measure a profile of a surface. Raw data obtained by the surface profiling instrument is filtered to produce data indicative of surface finish quality. One type of data that can be extracted is known as waviness, which focuses on longer wavelength undulations of the surface.

A waviness parameter known as $W_T$ measures the maximum peak to valley height of the surface over a sampled distance. Prior filtering techniques for extracting parameters such as $W_T$ severely attenuate the true waviness profile of the surface, yielding a $W_T$ waviness parameter value that is substantially lower than the actual value.

Applicants of the present invention have recognized that prior filtering and measurement techniques are not sensitive to localized changes in waviness and cannot distinguish or detect regions where waviness changes rapidly. Such filtering and measurement deficiencies were not previously known by those skilled in the art. In addition, Applicants have discovered that the detection of different waviness regions or localized changes in waviness is beneficial in predicting sealing problems between mating surfaces of an assembly, such as between a gasket and one or more mating surfaces.

Before Applicants' invention, there was a need to more accurately determine the waviness of a surface. Moreover, there was a need for improved surface profile data analysis techniques that could detect different waviness regions or localized changes in waviness. In addition, there was a need for improved data analysis techniques to predict gaps between mating part surfaces of an assembly before assembling parts together. Problems associated with the prior art as noted above and other problems are addressed by the Applicants' invention as summarized below.

SUMMARY OF THE INVENTION

According to one aspect of the present invention, a method for analyzing waviness of a surface is provided. The method includes the steps of measuring a height of the surface over a predetermined distance with a surface profiling instrument, filtering data gathered with the surface profiling instrument to produce a set of data points indicative of a waviness profile, selecting a subset of the set of data points, determining a peak value and a valley value of the subset, calculating a waviness height of the subset based on the peak and valley values, repeating the selecting, determining, and calculating steps for additional subsets until all members of the set of data points have been selected, and selecting a maximum waviness height value from the waviness height values calculated for each subset. This methodology more accurately analyzes the waviness of the surface and facilitates the detection of localized changes in waviness.

The method may include the step of comparing the maximum waviness height value to a threshold value and generating an acceptance signal if the maximum waviness height value is less than the threshold value or generating a reject signal if the maximum waviness height value is greater than the threshold value.

The subset may include a predetermined member of consecutive data points. Each subset may include the same number of data points. Each subset may include at least one data point included in a previous subset and may include at least one data point not included in a previous subset.

The predetermined distance may be at least two cutoffs longer than a specified number of cutoffs, such as eighteen times greater than a specified cutoff length.

According to another aspect of the present invention, a method for analyzing waviness of a machined surface is provided. The method includes the steps of obtaining a data set having a plurality of sequential data points indicative of a waviness profile of the machined surface, establishing a size of a data processing window representing a predetermined number of sequential data points, positioning the data processing window to include a first data point in the data set, selecting a subset of the data set, determining a peak value and a valley value of the subset, calculating a peak-to-valley waviness height based on the difference between the peak and valley values, indexing the data processing window to select another subset having at least one different member than a previous subset, and repeating the selecting, determining, calculating, and indexing steps for additional subsets until each data point in the data set has been selected at least once.

The method may include the step of reevaluating the size of the data processing window size for different analysis iterations with each analysis window yielding a maximum waviness value over the predetermined distance for different window sizes selected. The data processing window may be indexed such that a first sequential data point in the subset is removed from the subset. This is removed from the subsequent subset and the next data point in sequence is added to the subset. The data processing window may be indexed by more than one data point each iteration. The data processing window size may be five times greater than a cutoff length representative of a spacial frequency.

According to another aspect of the present invention, a method for predicting leakage between a gasket and a surface of a part is provided. The method includes measuring a height of the surface over a predetermined distance with a surface profiling instrument, determining a waviness profile having a set of data points, selecting a subset of the set of data points that includes a predetermined number of consecutive data points, determining a peak value and a valley value of the subset, calculating a peak-to-valley height of the subset based on a difference between the peak and valley values, repeating the selecting, determining, and calculating steps for additional subsets until all data points have been selected at least once, selecting a maximum waviness height value from the peak-to-valley heights calculated for each subset, comparing the maximum waviness height value to a threshold value indicative of a localized waviness region, and rejecting the part if the maximum waviness height value exceeds the threshold value.

The surface profiling instrument may be a profilometer. The part may be an engine block or a cylinder head.

DETAILED DESCRIPTION OF THE PREFERRED EMBODIMENT(S)

Figure 1:
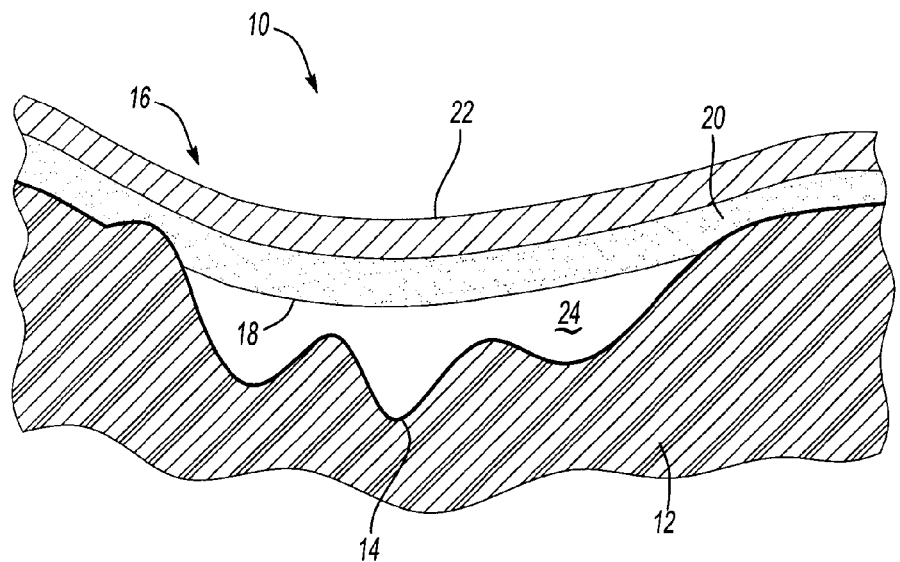
FIG. 1 is a magnified section view of a gasket and a surface of a part.

Referring to FIG. 1, a magnified section view of an assembly 10 is shown. The assembly includes a first part 12 having a first mating surface 14 and a second part 16 having a second mating surface 18.

The first and second parts 12,16 may have any suitable configuration and may be of any suitable type. For example, the first part 12 may be a component associated with an internal combustion engine, such as an engine block or cylinder head, and the second part 16 may be a seal or gasket having one or more layers. In the embodiment shown in FIG. 1, the second part 16 is configured as a gasket and includes a first layer 20 and a second layer 22. The second layer 22 is disposed adjacent the first layer 20 and is adapted to seal against the first mating surface 14. The first and second layers 20,22 may have any suitable configuration and may be made of any suitable materials. For example, the first layer 20 may be a metal and the second layer 22 may be a polymeric material, such as rubber.

In an assembly that employs a gasket, it may be desirable to configure the first and second mating surfaces 14,18 such that they are parallel to each other to facilitate sealing. However, the first and/or second mating surfaces 14,18 may have a various anomalies or deviations from an ideal or desired surface configuration. These deviations may result in a void or gap 24 between the first and second mating surfaces 14,18 and lead to fluid leakage. Moreover, the gasket may not be able to flex sufficiently to seal the gap if the first mating surface 14 has sharp, localized change in slope or waviness.

Many factors may affect the quality of the surface finish and the presence of gaps. Some factors are related to the type of manufacturing process employed, such as feed rate, cutting tool rotational speed, tool type, tool settings, environmental conditions, and the parallelism, straightness, and orthogonality of machine tool axes. In addition, structural attributes of the manufacturing equipment may also affect surface quality. For example, if a part is not adequately supported during the manufacturing process, the part may deflect or bend in response to the load forces imparted by a cutting tool. The part will attempt to return to its original position when the load forces are removed, thereby accentuating the curvature or waviness of the surface.

The profile of a surface may be measured with a data acquisition device, such as a surface profiling instrument. The surface profiling instrument may be of any suitable type, such as a contact or non-contact profilometer. For example, in the case of a profilometer having a data acquisition stylus, the stylus is placed substantially parallel to the surface being measured and moved in a linear direction over the surface for a predetermined distance, also called a traverse length. As the stylus moves, a sequence of unfiltered or "raw" data points indicative of the vertical profile of the part is collected in a digitized form.

The raw data may be processed to quantify surface profile deviations and compared to product and manufacturing specifications to determine whether the surface undulations are within specified limits. More specifically, raw data obtained by the surface profiling instrument may be filtered to produce data representative of surface waviness and roughness. Moreover, a portion of the raw data acquired at the ends of the traverse length may be ignored, thereby defining an evaluation length, and the remaining data points are filtered and analyzed.

Waviness data may be produced by applying a digital filter in the analysis software employed during data processing. One step in the filtering process is to generate a least squares regression line for the raw data in a manner known by those skilled in the art. The least squares regression line is then subtracted from the raw digitized data to correct for any lack of parallelism between the axis of the profilometer stylus and the surface. The resulting profile is then filtered to extract the waviness and roughness profiles and their associated parameters. By appropriate filtering, short wavelength roughness undulations are suppressed and the waviness profile is generated. For example, a cutoff filter may be used to specify the range of spatial wavelengths (or the spatial frequencies) in the waviness and roughness data.

The aforementioned data processing steps over an evaluation length equal to a specified number of cutoffs can severely attenuate the measured waviness profile of the surface and yield parameter values, such as the maximum wave height (denoted "$W_T$" or "$W_{TMax}$" below) that are substantially lower than the actual or true value.

Figure 2:
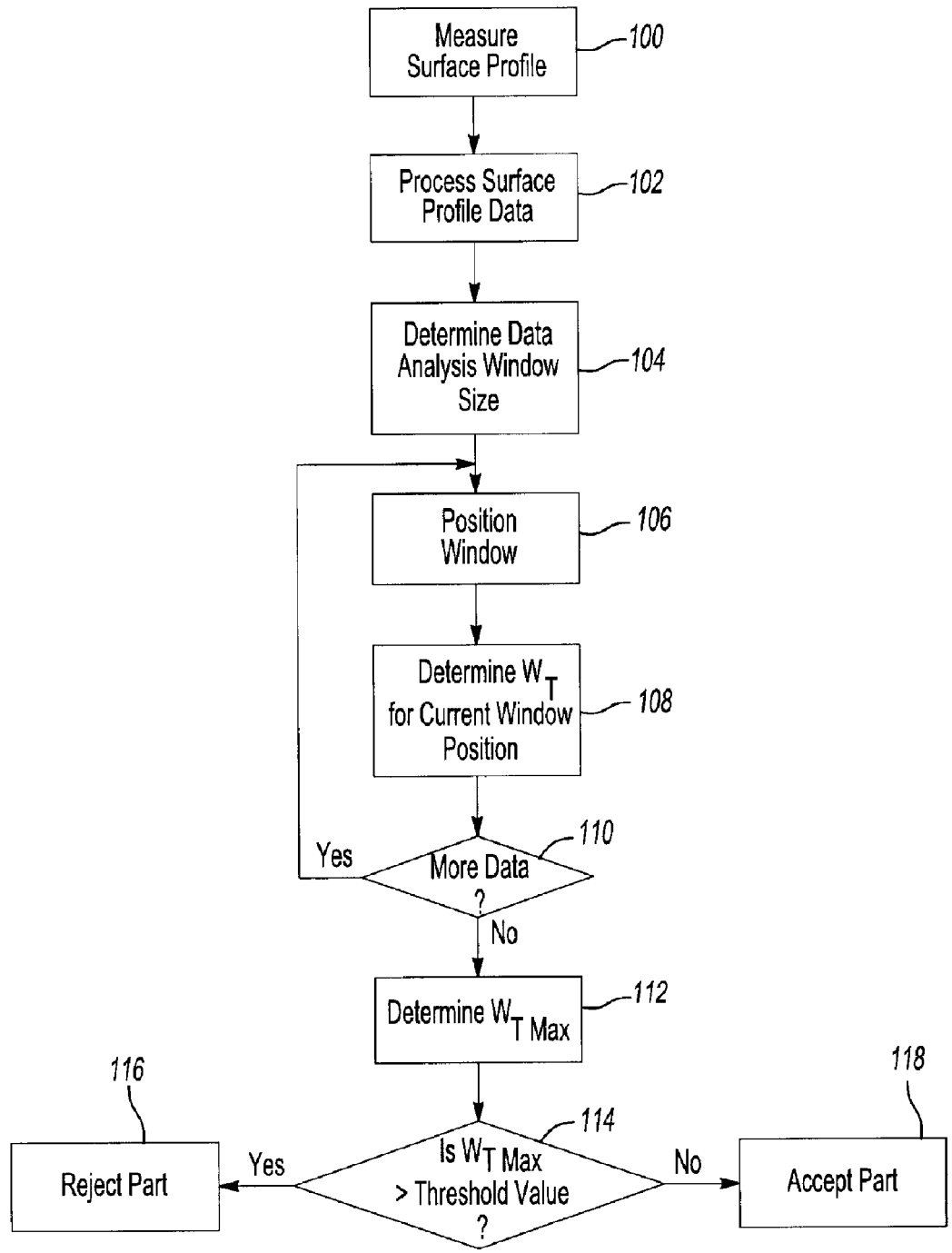
FIG. 2 is a flowchart of a method for analyzing waviness of the surface.

Referring to FIG. 2, a method for analyzing the waviness of a part is shown. The method provides improved detection of localized changes in waviness over prior methods and provides improved detection of conditions indicative of gaps between mating surfaces of an assembly.

As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

At 100, the method begins by measuring the profile of a surface with the surface profiling instrument as previously discussed. More specifically, raw profile data may be gathered over a long traverse length, such as a predetermined distance that is greater than the specified number of cutoffs. The traverse length or predetermined distance may be any suitable distance and may be based on quantitative analysis or experimentation. For example, the traverse length may be at least two times the specified number of cutoffs, such as eighteen times the cutoff length or may exceed 40 mm.

At 102, the method processes the surface profile data. This processing may include fitting a regression line to the raw data, subtracting the regression line from the raw data, and filtering the data to obtain a set of data points indicative of the waviness of the surface.

At 104, the method determines a size of a data analysis window. The data analysis window size represents a subset of the set of filtered waviness data points. The data analysis window may include a predetermined number of data points and may be have a size less than the traverse length. In one embodiment, the window size is five times the cutoff length specified in accordance with product design and manufacturing requirements.

At 106, the method begins an iterative sequence of data processing steps. At 106, the data analysis window is positioned to select a particular subset of data points. During the first iteration, the window is positioned to include the first data point in the set. During subsequent iterations, the window includes subsets of data points that include at least one different member than a previous subset as described in more detail below.

At 108, the method selects data from the current subset and determines the maximum wave height for the current subset, denoted $W_{tn}$, where n is an integer designating the current subset (e.g., the maximum wave height of the first subset is $W_{t1}$, the maximum wave height of the second subset is $W_{t2}$, and so on). $W_{tn}$ may be determined as a function of the expression:

$$W_{tn} = W_{pn} - W_{vn}$$

where:

n is an integer representative of the current subset, $W_{pn}$ is the maximum peak height in subset n, and $W_{vn}$ is the maximum valley depth in subset n.

At 110, the method determines whether there is additional data to analyze. More specifically, the method determines whether each data point in the data set has been included in at least one subset. If there is additional data that has not been analyzed, then the method returns to blocks 106 and 108 to select a new subset from the set of data points and determine the value of $W_{tn}$ for the new subset. If there is no additional data to analyze, then the method continues at block 112.

If the method returns to block 106, the data analysis window is indexed to a new position such that one or more data points in the previous subset are removed and one or more additional data points are included. For example, the window may be indexed by one data point such that the first data point in the subset from the previous iteration is deleted and the next data point in sequence is added. Alternatively, the window may be indexed by more than one data point during each iteration. Optionally, the window size may be reevaluated and modified so that the window size is not constant for all iterations.

At 112, the maximum wave height of the profile, designated $W_{TMax}$, is determined by selecting the overall maximum wave height from the maximum wave heights calculated for each subset (i.e., $W_{t1}$, $Wt_2$, ... $W_{tn}$).

At 114, the method determines whether $W_{TMax}$ is greater than a threshold value. If $W_{TMax}$ is greater than the threshold value, then the method continues at block 116. If $W_{TMax}$ is not greater than the threshold value, then the method continues at block 118. The threshold value may be determined by development testing or by quantitative analysis that assesses the material properties and configurations of the mating surfaces.

At 116, a signal indicative of unacceptable surface finish waviness is generated. The signal may be communicated to an operator so that corrective actions may be taken. In addition, the signal may be used to help contain the rejected part and insure that the part is not built up into a final assembly.

At 118, a signal indicative of acceptable surface finish waviness is generated if $W_{TMax}$ is less than the threshold value, indicating an acceptable level of waviness.

Figure 3A:
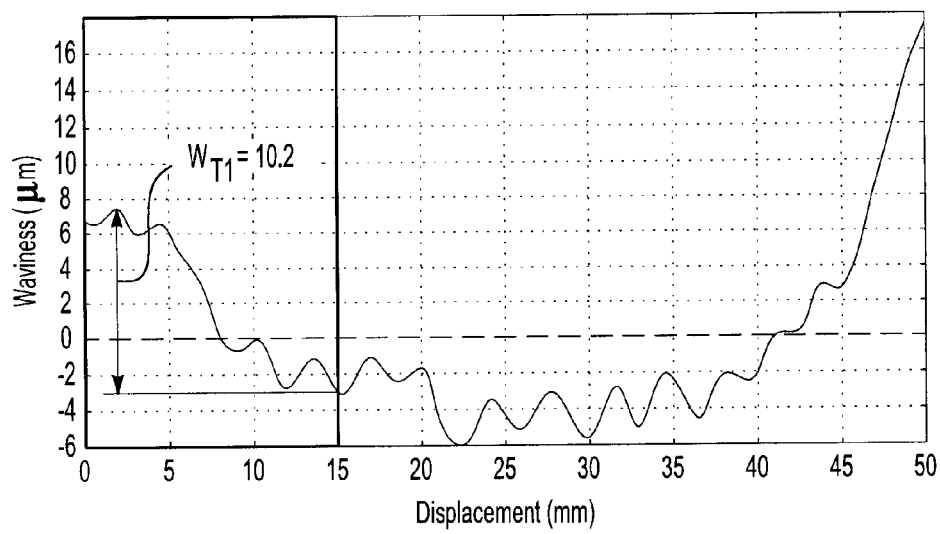
FIGS. 3A–3C are plots depicting analysis of the part surface in accordance with the method of FIG. 2.
Figure 3B:
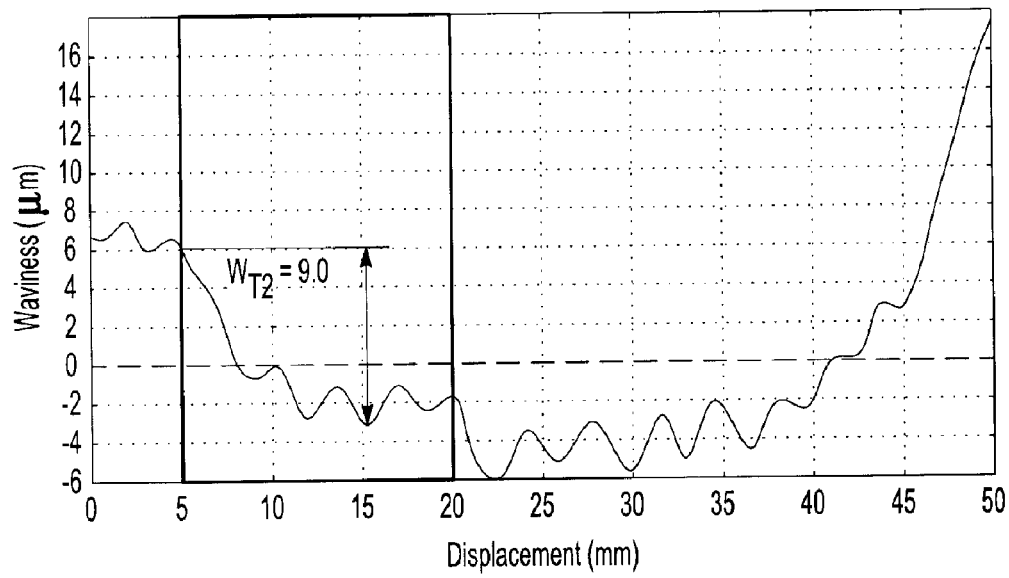
Figure 3C:
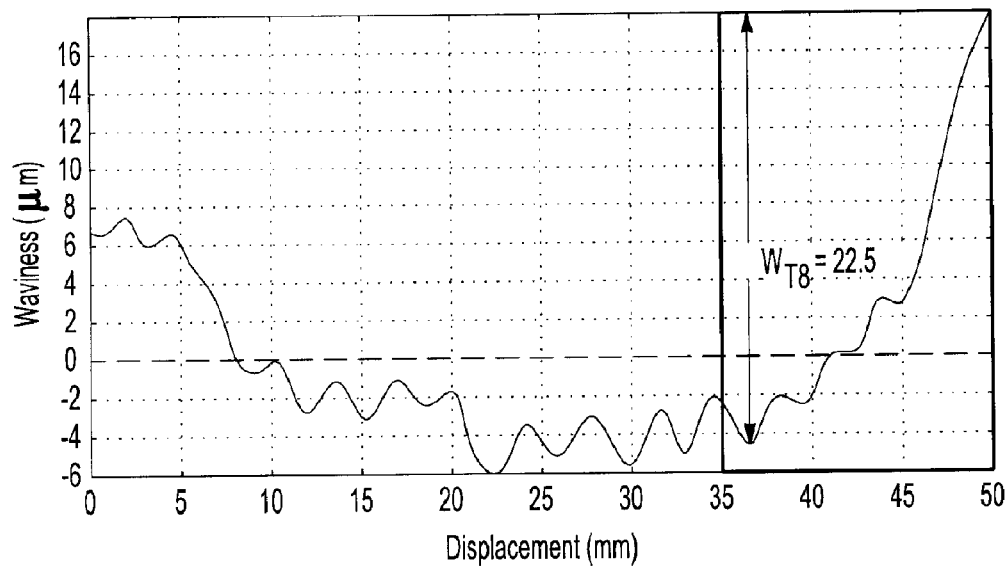

Referring to FIGS. 3A–3C, a graphical representation of analysis of waviness data in accordance with the method of FIG. 2 is shown. In FIGS. 3A–3C, the vertical axis depicts waviness of the part in micrometers (μm). The horizontal axis depicts the displacement along the traverse distance in millimeters (mm). In this example, the traverse distance is 50 mm. The waviness profile is represented by the undulating line. In this example, the data analysis window has a width or size of 15 mm and is indexed 5 mm each iteration. However, the window size and index distance may be any suitable amounts as previously discussed.

In FIG. 3A, a data analysis window is represented by the rectangle located at the left of the plot. The data analysis window contains a subset of the sequence of waviness data points between 0 mm to 15 mm and is designated subset one (n=1). The maximum peak height from the zero datum in this subset ($W_{p1}$) is 7.2 μm, which occurs at a displacement of approximately 2 mm. The maximum valley depth of this subset ($W_{v1}$) is –3.0 μm, which occurs at 15 mm. The maximum wave height of the first subset ($W_{t1}$) is 10.2 mm [$W_{t1} = W_{p1} - W_{v1} = 7.2 - (-3.0)$].

Referring to FIG. 3B, the data analysis window is shown indexed to a second position. In the second position, the data analysis window includes a subset of the sequence of data points between 5 mm and 20 mm, designated subset two (n=2). The maximum peak height in this subset ($W_{p2}$) is 6.0 μm, which occurs at a displacement of 5 mm. The maximum valley depth of this subset ($W_{v2}$) is –3.0 ηm, which occurs at 15 mm. The maximum wave height of the second subset ($W_{v2}$) is 9.0 mm [$W_{t2} = W_{p2} - W_{v2} = 6.0 - (-3.0)$].

The method continues to index the data analysis window in predetermined increments to select additional subsets of data points (in this example, eight subsets are evaluated). In this embodiment, the window size remains constant during each iteration and may be established in accordance with the specified number of cutoffs. Alternatively, the window size may be reevaluated for different data analysis purposes, such as troubleshooting or testing.

Referring to FIG. 3C, the data analysis window is shown in an eighth position (n=8). In the eighth position, the data analysis window includes a subset of the sequence of data points between 35 mm and 50 mm. The maximum peak height in this subset ($W_{p8}$) is 18.0 μm, which occurs at a displacement of 50 mm. The maximum valley depth of this subset ($W_{v8}$) is –4.5 μm, which occurs at approximately 37 mm. The maximum wave height of the eighth subset ($W_{t8}$) is 22.5 mm [$W_{t8} = W_{p8} - W_{v8} = 18.0 - (-4.5)$].

Once the maximum wave heights have been calculated for each subset (in this example $W_{t1}$, $W_{t2}$, ... $W_{t8}$), then the maximum wave height of the profile ($W_{TMax}$) may be selected and its location may be recorded. In this example, the maximum subset wave height is found in the eighth subset ($W_{t8}$). Therefore, the method sets $W_{TMax}$ equal to 22.5 mm.

The method of the present invention provides less attenuated analysis of waviness data. Moreover, this analysis method is sensitive to localized changes in waviness and can distinguish or detect regions where waviness changes rapidly. In addition, parameters obtained from this analysis technique may be used to determine the potential for voids or leakage between mating surfaces, such as between a gasket and a machined surface, before the time, labor, and expense of building a final assembly is incurred.

While the best mode for carrying out the invention has been described in detail, those familiar with the art to which this invention relates will recognize various alternative designs and embodiments for practicing the invention as defined by the following claims.

What is claimed is:

1. A method for analyzing waviness of a surface, the method comprising:
    measuring a height of the surface over a predetermined distance with a surface profiling instrument;
    processing data gathered with the surface profiling instrument to produce a set of data points indicative of a waviness profile;
    selecting a subset of the set of data points;
    determining a peak value and a valley value of the subset;
    calculating a waviness height of the subset based on the peak and valley values;
    repeating the selecting, determining, and calculating steps for additional subsets until all members of the set of data points have been selected; and
    selecting a maximum waviness height value from the waviness heights calculated for each sub set;
    wherein each subset includes a predetermined number of consecutive data points.

2. The method of claim 1 wherein the surface profiling instrument is a profilometer.

3. The method of claim 1 further comprising comparing the maximum waviness height value to a threshold value and generating an acceptance signal if the maximum waviness height value is less than the threshold value.

4. The method of claim 1 further comprising comparing the maximum waviness height value to a threshold value and generating a reject signal if the maximum waviness height value is greater than the threshold value.

5. The method of claim 1 wherein each subset includes at least one data point included in a previous subset.

6. The method of claim 1 wherein each subset includes at least one data point not included in a previous subset.

7. The method of claim 1 wherein the predetermined distance is at least two times greater than a specified number of cutoffs over which waviness assessment is conducted.

8. A method for analyzing waviness of a machined surface, the method comprising:
    obtaining a data set having a plurality of sequential data points indicative of a waviness profile of the machined surface;
    establishing a size of a data processing window representing a predetermined number of sequential data points;
    positioning the data processing window to include a first data point in the data set;
    selecting a subset of the data set;
    determining a peak value and a valley value of the subset;
    calculating a peak-to-valley waviness height based on the difference between the peak and valley values;
    indexing the data processing window to select another subset having at least one different member than a previous subset;
    repeating the selecting, determining, calculating, and indexing steps until each data point in the data set has been selected at least once.

9. The method of claim 8 wherein the data processing window is indexed by one data point each iteration such that a first sequential data point in the subset is removed from the subset and the next data point in sequence in the data set is added to the subset.

10. The method of claim 8 wherein the data processing window is indexed by more than one data point each iteration.

11. The method of claim 8 wherein a size of the data processing window is five times greater than a cutoff length representative of a spacial frequency.

12. A method for analyzing waviness of a surface, the method comprising:
    measuring a height of the surface with a surface profiling instrument to obtain data over a predetermined distance;
    fitting a regression line to the data;
    subtracting the regression line from the data over the predetermined distance;
    filtering the data to determine a waviness profile having a set of data points;
    selecting a subset of the set of data points that includes a predetermined number of consecutive data points;
    determining a peak value and a valley value of the subset;
    calculating a peak-to-valley height of the subset based on a difference between the peak and valley values;
    repeating the selecting, determining, and calculating steps for additional subsets until all data points have been selected at least once;
    selecting a maximum waviness height value from the peak-to-valley heights calculated for each subset;
    comparing the maximum height waviness value to a threshold value indicative of a localized waviness region; and
    rejecting the part if the maximum waviness height value exceeds the threshold value.

13. The method of claim 12 further comprising the step of accepting the part if the maximum waviness height value does not exceed the threshold value.

14. The method of claim 12 wherein the surface is adapted to mate to a gasket.

15. The method of claim 14 wherein the surface is disposed on an engine block.

16. The method of claim 14 wherein the surface is disposed on cylinder head.

17. The method of claim 12 wherein the surface is a portion of a transmission component.

18. The method of claim 12 wherein each subset includes the same number of data points.

19. The method of claim 12 wherein a first data point in the first subset and a last data point in the last subset are not members of any other subset.

20. The method of claim 12 wherein the predetermined distance is greater than 35 mm.

* * * * *